United States Patent [19]

Shindo

[11] Patent Number: 4,482,329
[45] Date of Patent: Nov. 13, 1984

[54] TEACHING TOY

[75] Inventor: Yasushi Shindo, Tokyo, Japan

[73] Assignee: Tomy Kogyo Co., Inc., Japan

[21] Appl. No.: 440,826

[22] Filed: Nov. 12, 1982

[30] Foreign Application Priority Data

Jul. 1, 1982 [JP] Japan ................................ 57-1144

[51] Int. Cl.$^3$ .............................................. G09B 3/00
[52] U.S. Cl. .................................................. 434/342
[58] Field of Search ............................... 434/327, 342

[56] References Cited

U.S. PATENT DOCUMENTS

| | | | |
|---|---|---|---|
| 2,062,453 | 12/1936 | Hastings | 434/342 |
| 2,311,217 | 2/1943 | Emmert | 434/327 |
| 2,687,579 | 8/1954 | Davis | 434/327 |
| 2,924,889 | 2/1960 | Di Lauro | 434/342 |
| 3,195,242 | 7/1965 | Ward et al. | 434/342 |
| 4,015,346 | 4/1977 | Ogasawara | 434/304 |

Primary Examiner—William H. Grieb
Attorney, Agent, or Firm—K. H. Boswell; Edward D. O'Brian

[57] ABSTRACT

A toy capable of teaching certain information to a child includes a housing having an information display system located on the housing. Indicia is located on a portion of the information display system and is divided into units of information which are viewable one at a time from the exterior of the housing. A control mechanism is associated with the information display system. One of the members of the control system is capable of assuming a variety of positions on the housing with each of these positions coordinated with one of the units of information on the information display system. A test system is located in association with the control system and has at least a first and a second test element which are movable on the housing. The test elements interact with the control system such that they are capable of interacting either in a first manner or a second manner, which can be utilized to correlate a first and second answer with regard to the unit of information currently displayed. An indicator system is associated with the control system and is capable of indicating in which of the manners the test elements interacted with the control system such that the child may be apprised whether an answer was correct or incorrect with regard to the unit of information displayed on the information display system.

12 Claims, 16 Drawing Figures

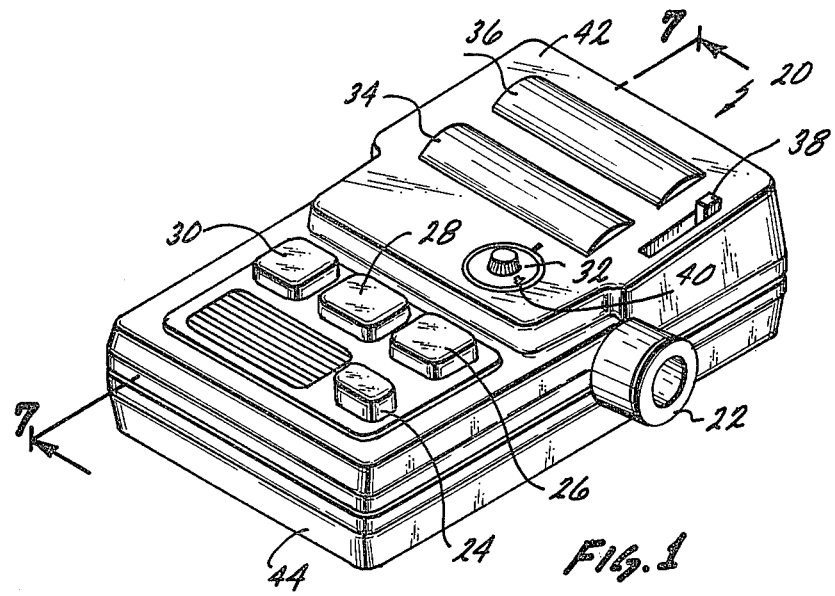
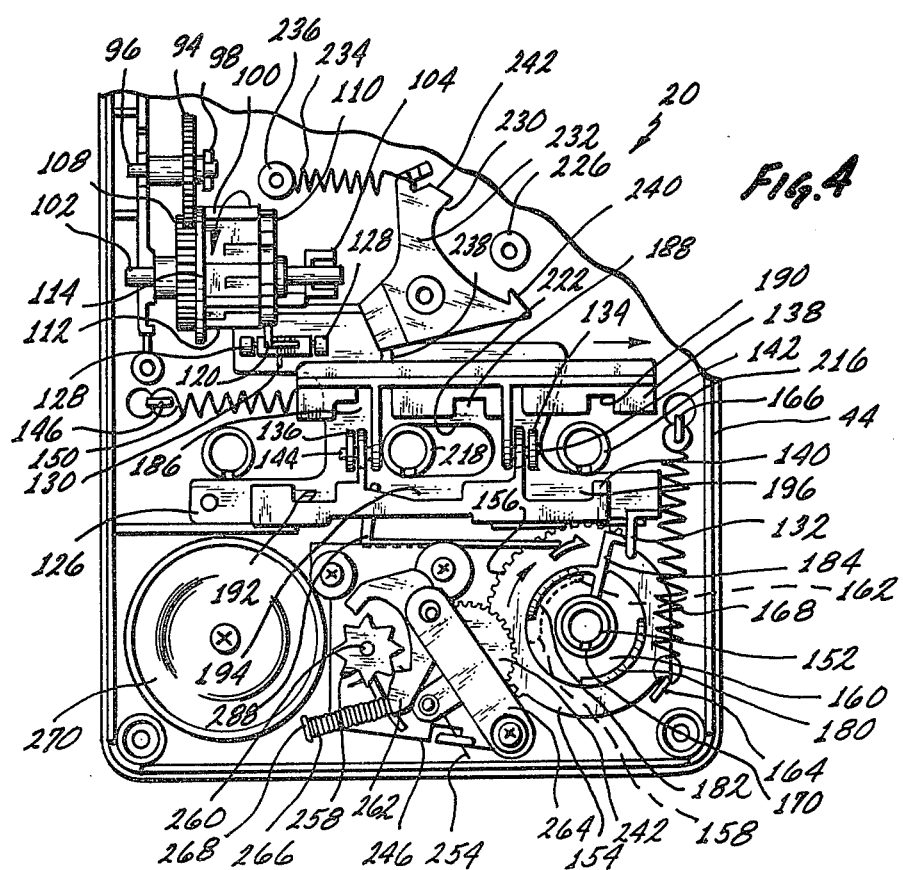

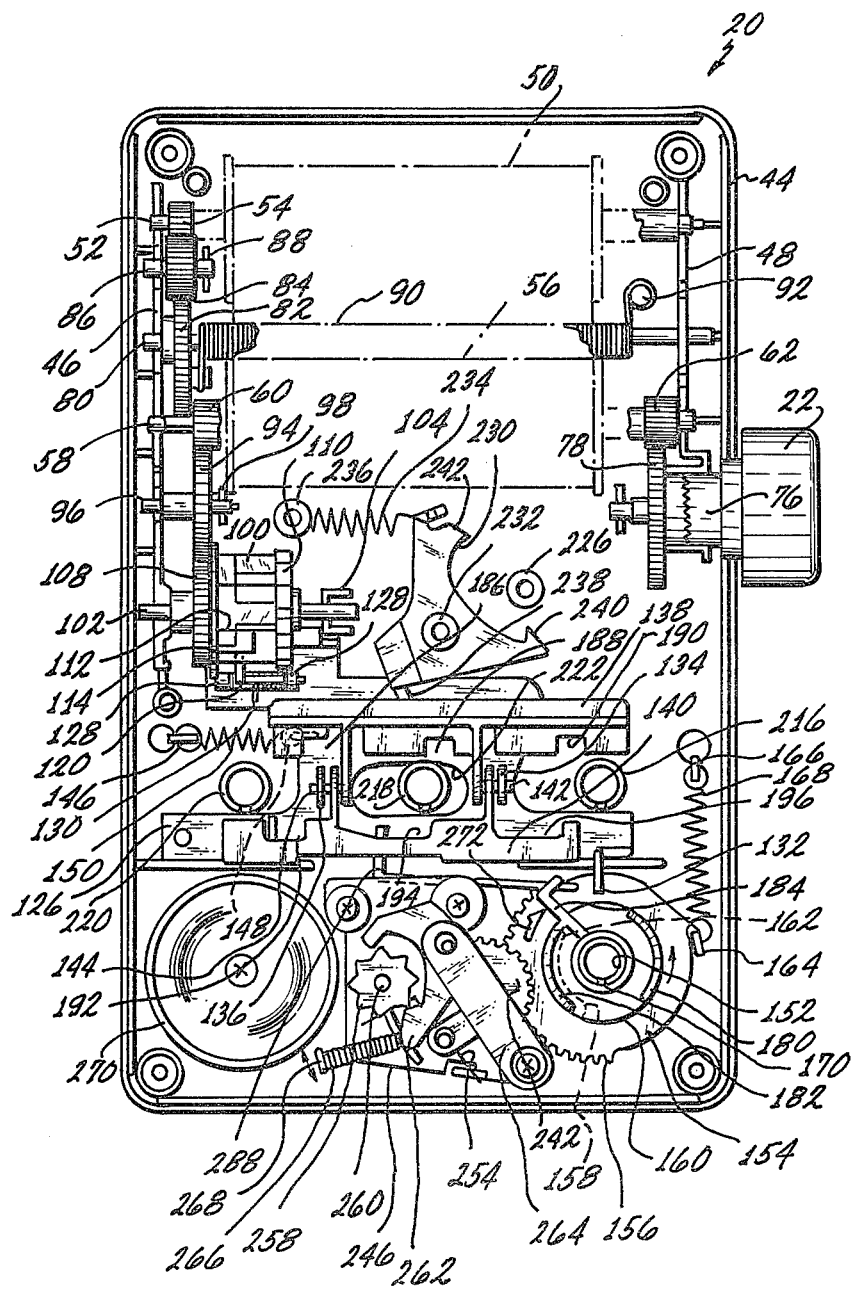

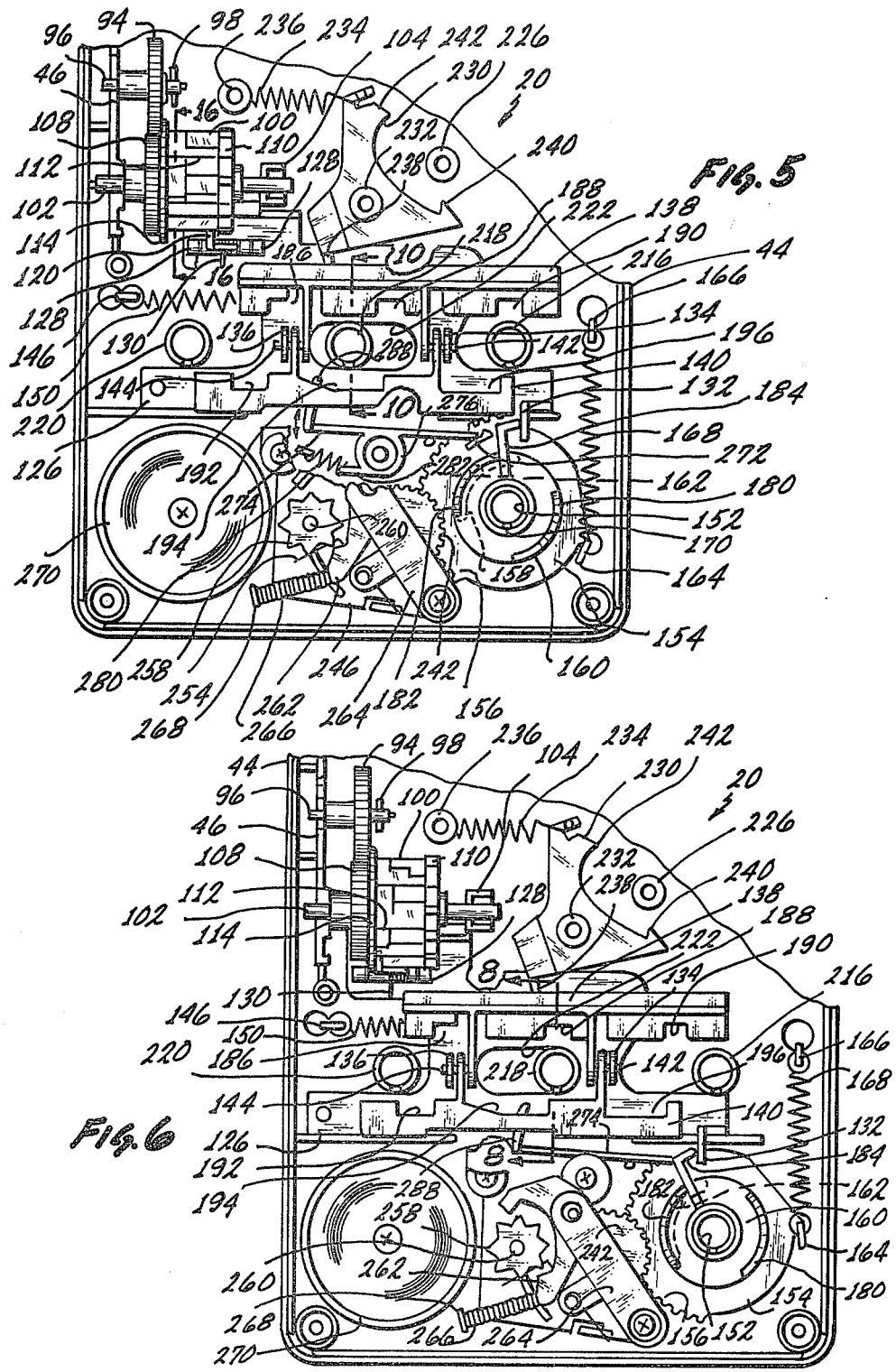

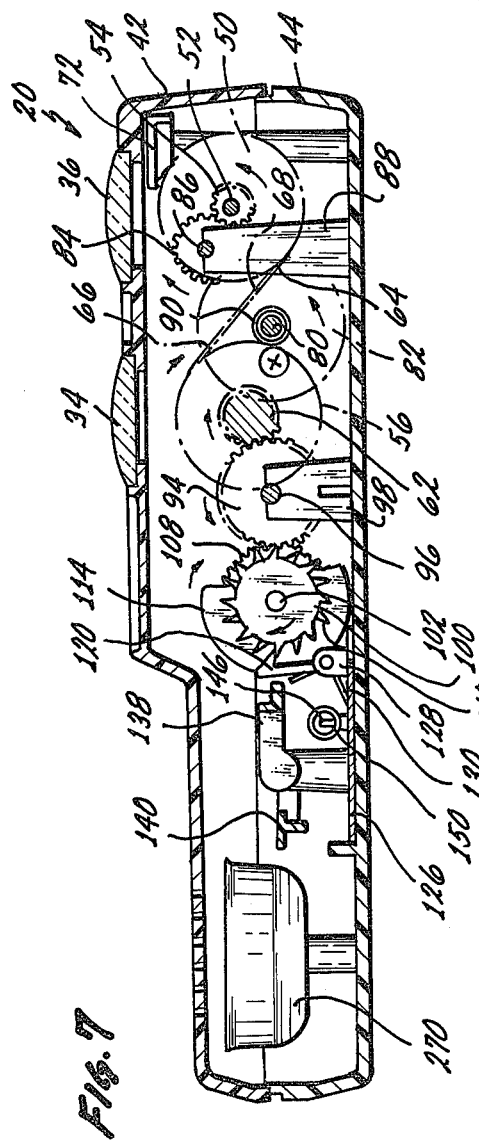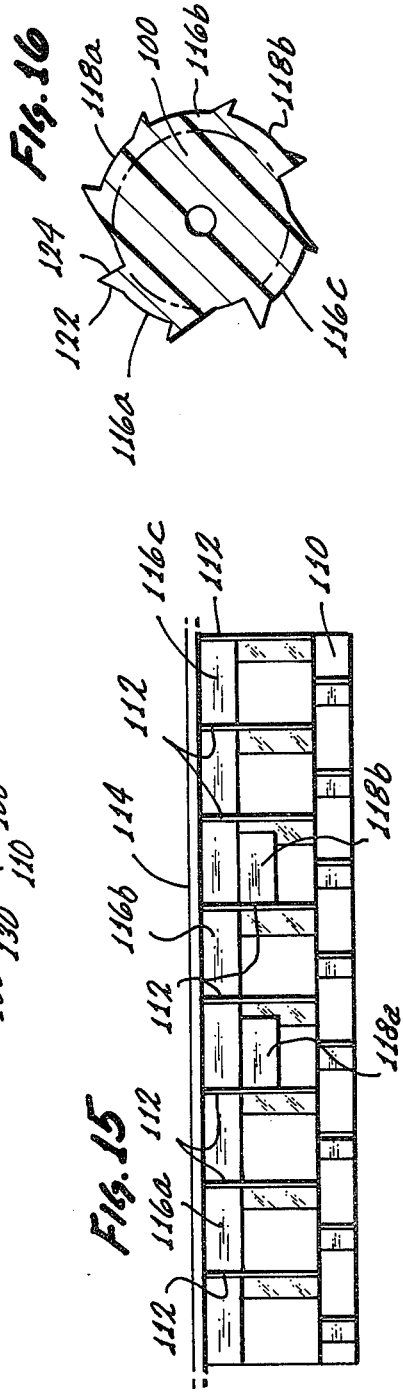

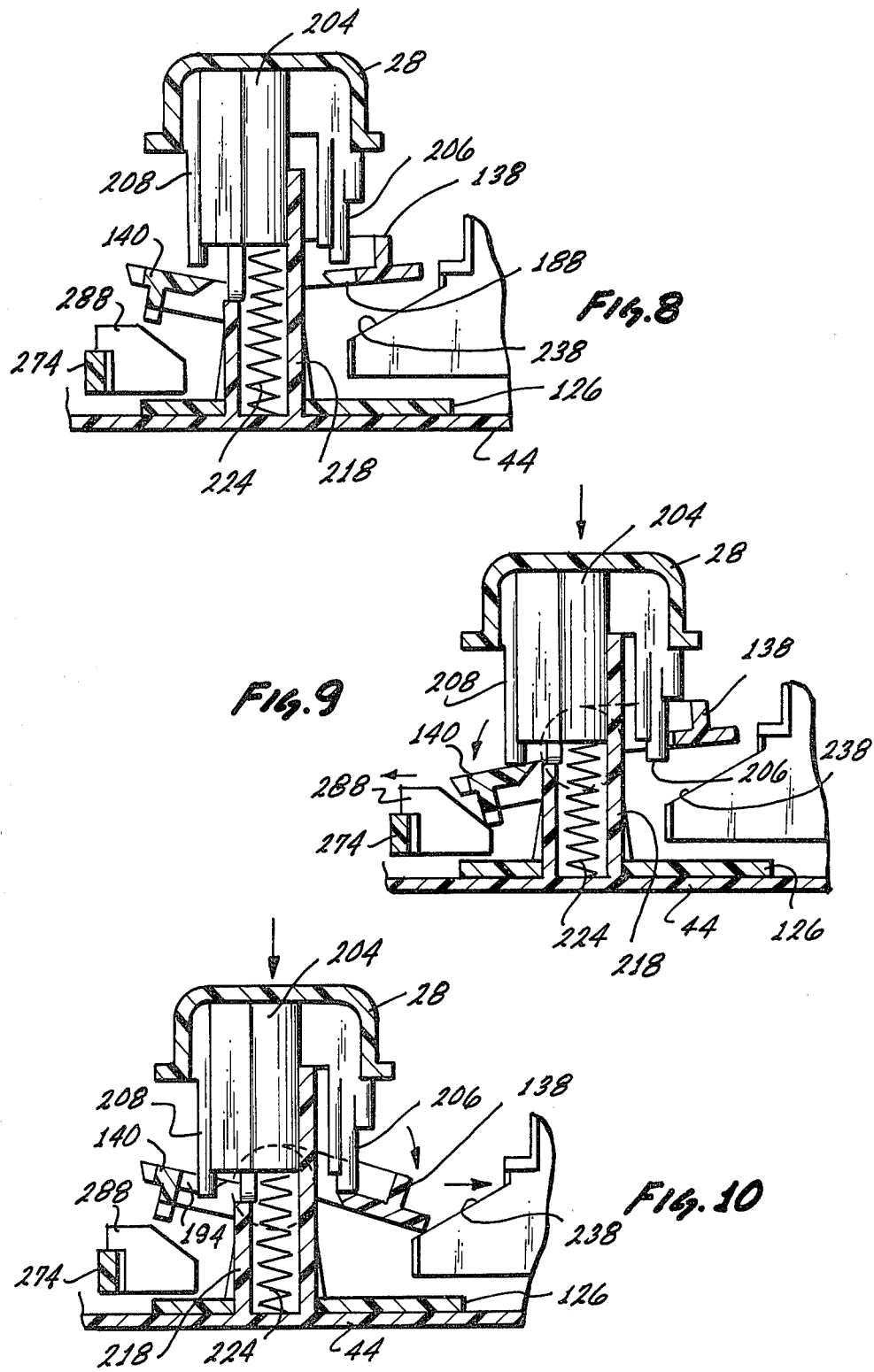

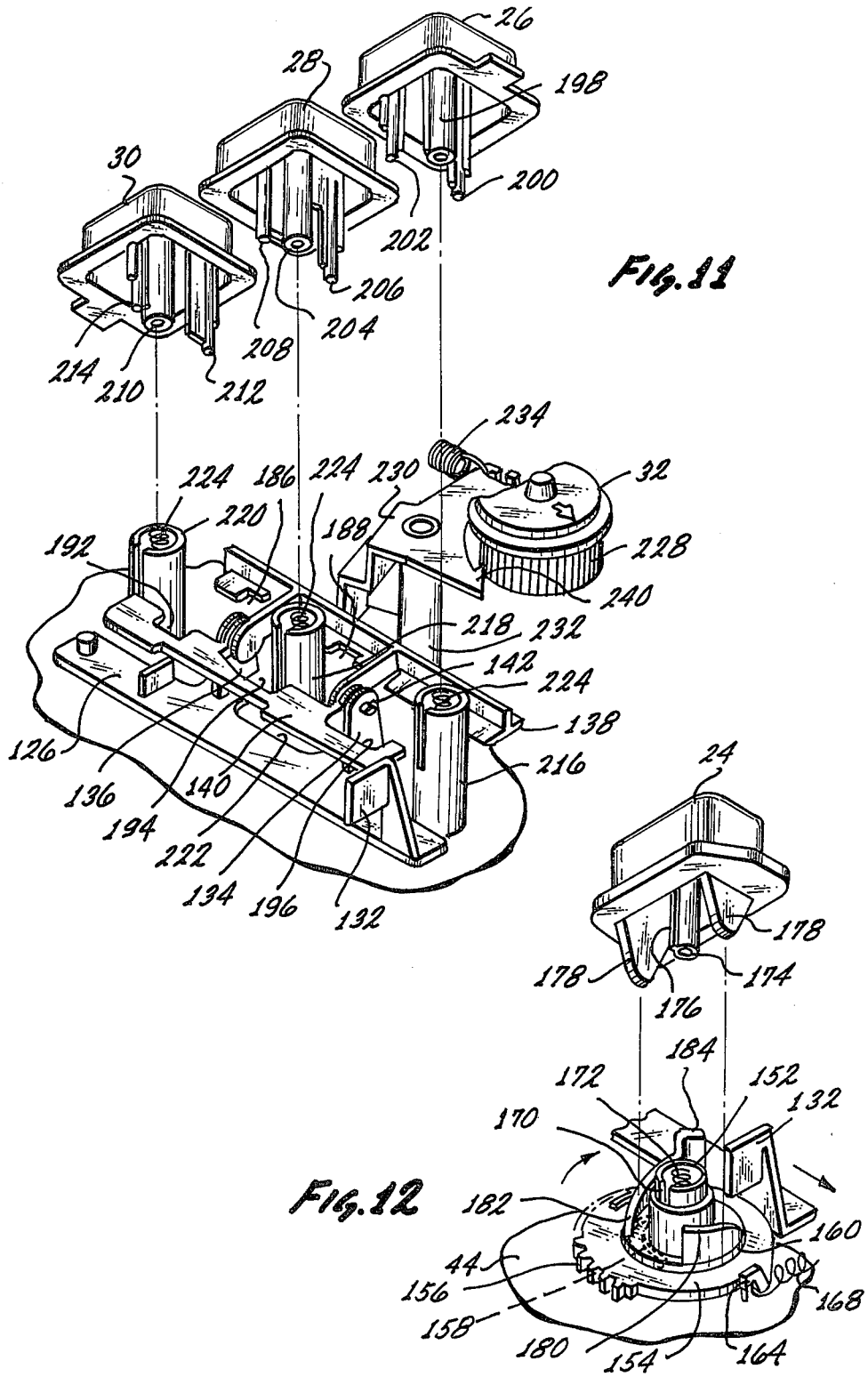

TEACHING TOY

BACKGROUND OF THE INVENTION

This invention is directed to a teaching toy in which a child can push one of a plurality of buttons on the toy to indicate a response with respect to a unit of information displayed on the toy. Most specifically, the toy can include information with regard to some specific aspect in which it is desirous to teach the child and the child can manipulate certain buttons on the toy to respond to this information and, upon manipulation of the buttons, the toy is capable of indicating a response to the child. The toy utilizes a coordinated control system based on mechanical components and movement of the same which are capable of communicating feedback to the child with respect to certain information presented to the child, and the child's response thereto.

In teaching children certain basic, fundamental concepts, such as counting, the names of common items, and the like, repetition serves as a portion of the learning process. The child can learn to count by repeatedly mimicking and repeating a counting sequence presented to the child by an adult or the like. Repeating the name of an object or the like a number of times in association with the object soon teaches the child to do the same.

While the repetitious process may, in fact, be stimulating to the child, and be at the extreme of his reasoning power, it can become very trite and boring for an adult participating in the same in a very short period of time. A child can learn to identify objects in books and the like and give a response to said objects. However, if an adult is not present to indicate to the child the correctness or incorrectness of the response given, the child is without guidance with resepct to whether ot not he is correctly identifying the object.

Many sophisticated learning machines are being developed. The majority of these types of items are based in integrated circuits and, as such, are precluded from being directed to a very small child either because of cost or complexity. Furthermore, many of these sophisticated devices are directed to an older intelligence level in how they disseminate information by the printing out of the same or displaying the same on a screen, or with LED's and the like. A small child learning to count has not yet reached a sophistication level wherein he can utilize this type of information dissemination in a way which would effectively enhance the learning process. As such, it is considered that these types of devices are not suitable for teaching very small children certain basic concepts in a self-teaching environment.

BRIEF DESCRIPTION OF THE INVENTION

In view of the above, it is a broad object of this invention to provide a toy which is capable of teaching young children certain basic information concepts, such as counting, object identification and the like. It is a further object of this invention to provide such a toy which produces an output which is easily recognized by the child as being correct or incorrect. Further, it is an object of this invention to provide such a toy which has certain play value so as to maintain the interest of the child during the learning process in order to further stimulate this learning process. Additionally, it is an object of this invention to provide such a toy which, because of its design engineering, is available at a low cost, but is able to withstand the rigors of extended usage over a long lifetime by one or more children.

These and other objects, as will become evident from the remainder of this specification are achieved in a toy information indicating device which comprises: a housing; an infomation display means located on said housing, said information display means including a plurality of information units, said units movable with respect to said housing allowing each of said units to be viewable at least one at a time from the exterior of said housing; control means mounted on said housing in operative association with said information display means, said control means having a plurality of control positions, each of said units of said information display means coordinated with one of said control positions; test means located on said housing in operative association with sad control means, said test means having at least a first test element and a second test element each of which is movable with respect to said housing such that for each of said positions of said control means one of said test elements in moving with respect to said housing interacts with said control means in a first manner and the remainder of said test elements in moving with respect to said housing interacts with said control means in a second manner; indicator means operatively associated with said control means and capable of indicating in which manner each of said test elements interacted with said control means.

The toy of the above paragraph can be augmented by further including an advancing means which is operatively associated with the control means and capable of advancing the control means from one of its control positions to the next of its control positions, and simultaneously advancing the units of said information on said information display means from the unit coordinated with said one of said control positions to the unit coordinated with the next of said control positions.

Preferredly, the control means would include a first control member and a second control member. Control positions would be governed by the first control member and the test means would interact with the second control member. The second control member would be operatively associated with and interacting with the indicator means in response to interaction of the second control member with the test means.

Preferredly, the indicator means would include a first output means and a second output means. The first output means would be capable of indicating interactions of the test elements with the control means in the first manner and the second output means would be capable of indicating interaction of the test elements with the control means in the second manner.

Preferredly, the information display means would include a support means and an indicia carrying means with the indicia carrying means located on the support means. The units of information of the information display means would comprise indicia located on the indicia carrying means with this indicia located in discrete bundles of information.

Preferredly, the control member would be rotatably mounted on the housing and would include positioning elements corresponding to the control positions located on it. The second control member would be slidably mounted on the housing and would include an element interacting means positioned in associaition with the first control member and capable of interacting with the positioning elements. The second control member would further include a first section, a second section and a third section with the first section slidably mounted on the housing. The element interacting means, the second section and the third section would each be independently mounted on and carried by the first section. The second section would be operatively associated with the first output means and the third section would be operatively associated with the second output means. The test elements would be independently capable of interacting with one of the second or the third sections in each of the control positions governed by the control member.

Preferredly, each of the test elements would be linearly movable on the housing from a non-engagable position with respect to the second control member to an engagable position with respect to the second control member. The second and third sections would each include a plurality of discontinuities located thereon with each of the test elements in their engagable positions capable of engaging one of the second or third members, but becoming located within one of the discontinuities on the other of the second or third members and not engaging the same, such that movement of the test element from its non-engaged to its engaged position engages said test element with one of said second or said third sections, but not the other of said second or said third sections.

Preferredly, the information support means would include a first and second roller means each rotatably mounted on the housing and the indicia carrying means would comprise an elongated strip capable of being wound about each of said roller means and having a surface carrying said indicia thereon. A gear means would be operatively associated with said first roller means and said first control member to rotate said first control member in response to rotation of said first roller means. The rotation of said first roller means transferred to said second roller means by said elongated strip. Said second roller means could further include biasing means operatively associated with it. Rotation of said second roller means in a first direction would energize said biasing means, and when so energized, said biasing means would be capable of rotating said second roller means in the opposite direction.

Preferredly, said positioning elements on said first control member would comprise positioning ratchet teeth equal in number to the number of said elements. Said positioning ratchet teeth would be divided into groups, the number of said groups equal in number to the number of said test elements. The groups of said elements would be positioned axially with respect to one another on the first control member. The element interacting means would comprise a pivotable pawl mounted on said second control member and capable of interacting with each of said groups of said positioning ratchet teeth with respect to a different axial displacement of said pawl to said first control member in response to sliding of said second control member on said housing.

Preferredly, each of the information units would include a plurality of responsive choices, the number of said responsive choices equal to the number of said test elements. Said responsive choices are divided into a responsive choice of a first type, with the remainder of the responsive choices divided into a second type. Said responsive choices of the first type corresponding to interaction of one of said test elements with said control means in said first manner, and said responsive choices of the second type corresponding to interaction of the remainder of said test elements with said control means in said second manner. The control positions of said control means would be arranged in a sequence. The responsive choices of the first type being arranged in what would seemingly be a random manner, but in fact, being arranged in said same sequence as said control positions. Said sequence of said control position would be repeatable such that said sequences of said responsive choices of said first type also would be repeatable in a like manner. As such, each of said control positions would control several of said responsive choices of said first type, one of said responsive choices of said first type being controlled for each repetition of said sequence.

BRIEF DESCRIPTION OF THE DRAWINGS

This invention will be further understood when taken in conjunction with the drawings wherein:

FIG. 1 is an oblique view of the outside motif of a toy of the invention;

FIG. 3 is a top plan view similar to FIG. 2 with even further overlaying components removed;

FIGS. 4, 5 and 6 are top plan views, showing a portion of the structure as seen in FIG. 3 with certain of the components in different spatial relationships in the different Figures;

FIG. 7 is a side elevational view in partial section about the line 7—7 of FIG. 1;

FIG. 8 is an elevational view, in section, about the line 8—8 of FIG. 6;

FIGS. 9 and 10 are elevational views similar to FIG. 8 with different components seen in different spatial relationships between the Figures;

FIG. 11 is an exploded view of certain of the components seen in FIG. 2;

FIG. 12 is an exploded view of a further component as seen in FIG. 2;

FIG. 15 is a representational view of one of the circular components seen in FIG. 3 with that component having its circular surface cut and depicted linearly to show the relationship of certain components located thereon; and FIG. 16 is a side elevational view, in section about the line 16—16 of FIG. 5.

Figure 2:
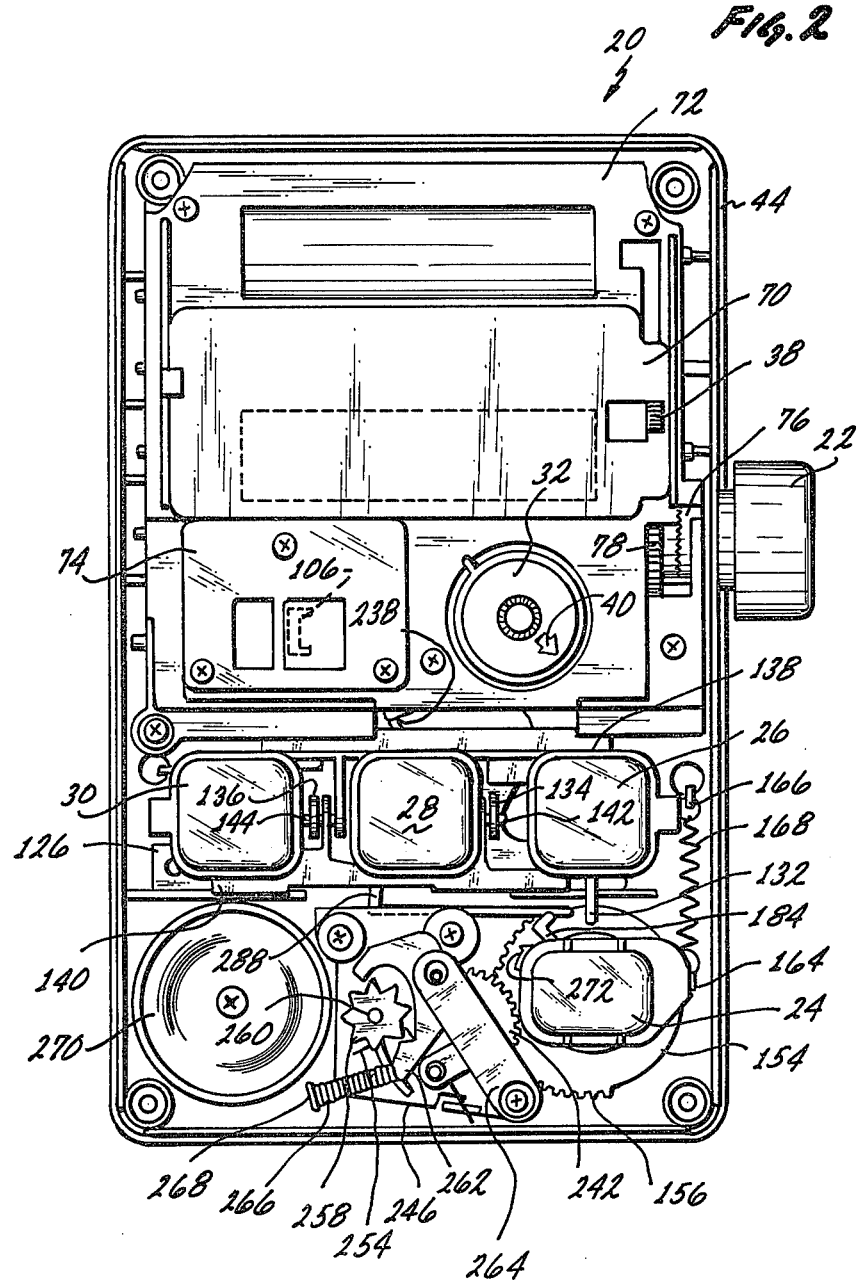
FIG. 2 is a top plan view of the toy of FIG. 1 with an overlaying component removed.

The invention described in this specification and illustrated in the drawings utilizes certain principles and/or concepts as are set forth in the claims set forth and appended to this specification. Those skilled in the toy arts will realize that these principles and/or concepts are capable of being illustrated in a variety of illustrative embodiments differing from the exact illustrative embodiment utilized herein. For this reason, this invention is to be construed only in light of the claims and is not to be construed as being limited to the illustrative embodiment.

DETAILED DESCRIPTION

In the drawings there is shown a toy 20 of the invention. Exposed out of the right side of the toy 20 is a rewind knob 22. Located on the top face of the toy near the lower right hand corner is advance button 24. Just above advance button 24 in a transverse line across the top surface of the toy are answer buttons 26, 28 and 30.

These are color coded with three colors, as for instance, red, yellow and blue for the buttons 26, 28 and 30, respectively. This allows a reference for the user of the game as will be evident below.

Immediately above the answer buttons is an indicator dial 32. Above the indicator dial 32 are bottom window 34 and top window 36. To the left of the windows is the selector lever 38.

The 20 is utilized as follows. The child utilizing the toy 20 utilizes the select lever 38 to choose either the top window 36 or the bottom window 34 by appropriately depressing the select lever 38 either toward one window or the other. As viewable in FIG. 1, the select lever 38 is positioned such that indicia will be exposed through top window 36. The child starts the game by winding the rewind knob 22 by turning the same in a clockwise direction until a certain resistance is felt. The indicator dial 32 is oriented to a start position by turning the same to line up a small arrow 40 molded on it with a appropriate marking on the top housing 42.

The advace button 24 is depressed. When this happens, the indicia is exposed through the window 36. This indicia can be expressed in a number of ways such as a question or the like. Along with the indicia will be several answers which will be color coded. For instance, a picture of an apple could be shown, and a question asked, "What is it?", with the word, "Apple" shown next to a red square, the word, "Orange" shown next to a blue square, and the word, "Pear" shown next to the yellow square. The child then chooses what he considers to be the correct answer and depresses the appropriate color-coded button associated with that answer. If the child correctly identified the word, "Apple" next to the red color code, the child would then depress the red answer button, button 26. When this answer button is depressed, a bell rings, indicating to the child that the correct answer was chosen.

If the child erroneously chose one of the other answers, which of course would be wrong, and depressed the color coded button corresponding to it, either the yellow or blue buttons, 28 or 30, the ringing sound would not be heard, and instead, the indicator dial 32 would rotate counterclockwise such that the arrow 40 located thereon would advance slightly toward a eleven o'clock position. If the child then chose to make a second guess, and chose the correct red button at this time, the bell would ring, and the noise would be heard, or if the child chose the other erroneous button, the blue button, and depressed the same, once again the indicator dial 32 would rotate a further increment counterclockwise, again advancing the arrow 40.

As was noted above, if the child appropriately chooses the right answer, an indication is given to the child which is expressed as the ringing of a bell. If the child chooses the wrong answer, an indication is given to the child which is expressed as rotation of the indicator dial 32. Once the correct answer is ascertained, the child is then ready to go on to the next question or the like, by pressing the advance button 24. This resets certain mechanisms within the toy 20 as will be explained below, and advances the indicia which is exposed through the bottom window 36. The child is now ready to proceed to the new indicia exposed through the bottom window 34 by pressing the buttons 26, 28 or 30 in the manner described above.

The toy 20, as noted above, includes the top housing 42. This mates with a bottom housing 44. These two housings are joined using appropriate screws or the like, not separately identified or numbered, fitting into appropriate bosses and holes, also not separately identified or numbered, located in the respective housings 42 and 44. The top housing 42 includes appropriate cutouts, not separately identified or numbered, serving to allow for exposure of the knob 22, the advance button 24 and the answer buttons 26, 28 and 30, as well as the select lever 38. The cutout, not separately identified or numbered, for the rewind knob 22 also extends into the bottom housing 44.

Figure 14:
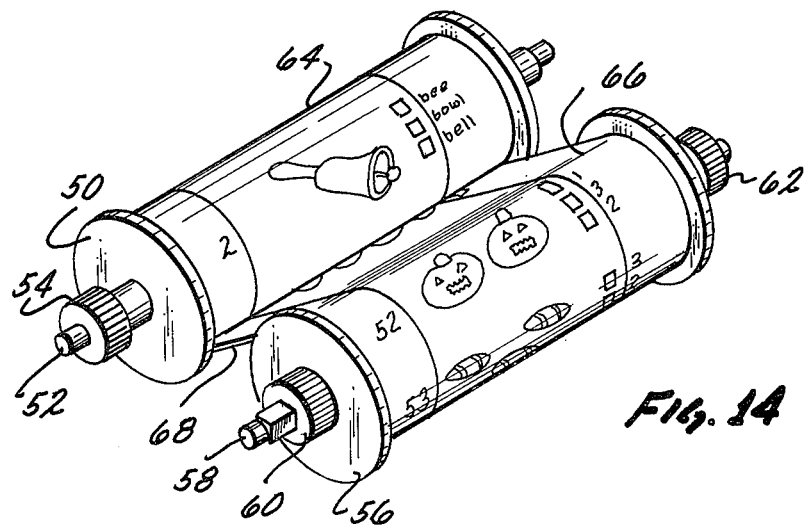
FIG. 14 is an oblique view of certain of the components seen in FIG. 3.

Referring now to FIGS. 2, 3 and 14, located along the left hand side of the upper portion of the bottom housing 44 is an upstanding web 46, having a plurality of cutouts located therein which serve as bearing surfaces for a number of components hereinafter identified. A similar web 48 is located on the right hand side of the bottom housing 44 and it, too, includes a number of cutouts, openings and the like, which also serve as bearing surfaces. The individual openings or cutouts in the webs 46 and 48 serving as bearing surfaces will not be separately identified or numbered for brevity of this specification.

A first spindle 50 is located about an axle 52. The axle 52 also carries a pinion 54 mounted thereon. The spindle 50 and pinion 54 are fixed to the axle 52 so that totality of these components rotate as a unit. A second spindle 56 is located about an axle 58 which has a first pinion 60 on one end, and a second pinion 62 on the other end. The spindle 56 and the pinions 60 and 62 are all fixed to the axle 58 and, as with the other spindle, these all rotate as a cohesive unit.

A paper strip 64 is wound about the two spindles 50 and 56 as seen in FIG. 14. Looking in the direction as seen in FIG. 14, it is wound about spindle 56 in a clockwise manner and about spindle 50 in a counterclockwise manner. As such, the top surface 66 of the paper strip 64 is exposed along the top of spindle 56 and the bottom surface 68 of the paper strip 64 is exposed along the top of spindle 50.

As can be seen in moving between FIGS. 2 and 3, the spindle 56 is positioned such that it can be exposed out of the top window 36, while the spindle 50 is positioned such that it can be exposed out of the bottom window 34, allowing the top surface 66 of the paper strip 64 to be seen through the bottom window 34 and the bottom surface 68 of the paper strip 64 to be seen through the top window 36.

Located just underneath the inside of the top housing 42 is a slide member 70, having the select lever 38 formed as a part thereof. In response to movement of the select lever 38, the slide member 70 slides over to cover either spindle 50 when the select lever is in its up position, or spindle 56 when the select lever 38 is in its down position. Thus depending upon the position of the select lever 38, either the top surface 66 of the paper strip 64 will be exposed through the bottom window 34, or the bottom surface 68 of the paper strip 64 will be exposed through the top window 36.

An internal plate 72 is mounted over the spindles 50 and 56 on to the webs 46 and 48 by appropriate screws and the like. The plate 72 serves as a slide platform for slide member 70 as well as foundation for a locating plate 74 which is attached to it by appropriate screws. The locating plate 74 serves to maintain a component as hereinafter described in a fixed position on the bottom housing 44. The plate 72 fits down along the top surfaces of the webs 46 and 48 and serves to hold certain axles and the like in the above noted bearing openings not separately identified or numbered, located in their respective webs 46 and 48. Thus, together, the webs 46 and 48, with the plate 72 serve to hold certain components as herein identified and including the spindle axles 52 and 58 in their respective positions within the toy 20.

The rewind knob 22 is joined to a thick axle 76 which carries a spur gear 78 located thereon. Both the spur gear 78 and the rewind knob 22 are fixed to the axle 76, thus the spur gear 78 rotates in response to rotation of the rewind knob 22. The spur gear 78 meshes with the pinion 62 which was carried on spindle axle 58. This communicates rotation of the rewind knob 22 to the spindle 58.

A shaft 80 has a spur gear 82 fixed to it. The shaft 80 is appropriately suspended in the webs 46 and 48. On the left hand side of the toy 20 a small pinion 84 is appropriately mounted on an axle 86 which is appropriately suspended by web 46 as well as a small projection 88, which serves as a bearing for the right hand side of the axle 86. The pinion 84 meshes with pinion 54 carried on spindle axle 52.

A spring 90 is fixed at one of its ends to the spur gear 82 and the other of its ends to the bottom housing 44 by looping the other end of the spring 90 around a small boss 92, which projects upwardly from the bottom housing 44. The spring 90 is wound around shaft 80.

As noted previously, at the start of use of the toy 20, the rewind knob 22 was turned until resistance was met. This wound the paper strip 64 from the spindle 50 on to the spindle 56. In so doing, the rotation imparted to the spindle 50 by the paper strip 64 moving off of it, rotated the pinion 54, which in turn rotates the pinion 84, and this in turn rotates the spur gear 82 and, because one end of the spring 90 is fixedly attached to it, the spring 90 is twisted about shaft 80. Because the other end of the spring 90 is fixed to the boss 92, the winding of the spring 90 by the spur gear 82 induces a bias into the spring 90 which ultimately biases the spindle 50 to rotate clockwise, such that the paper strip 64 is stretched, and the motion is communicated to the spindle 56 tending to rotate it counterclockwise. The spring 90 thus serves as the energizing mechanism for movement of the spindles 50 and 56 and the strip 64 located thereon, as well as transferring rotation from the pinion 60 to a spur gear 94, which is engaged with it.

Spur gear 94 is carried on an axle 96 which is supported by the web 46 as well as a projection 98 projecting upwardly from the bottom housing 44. A control drum 100 or first control member is mounted about an axle 102. The axle 102 is suspended in web 46 as well as an upstanding projection 104 projecting upwardly from the bottom housing 44. A finger 106 projects downwardly from the underside of the locking plate 74 and rests on the top of the axle 102 on the left hand side of the projection 104. This keeps the axle 102 and the control drum 100 in a fixed position on the bottom housing 44 but allows for rotation of the control drum 100. In essence, the finger 106 serves as a thrust bearing to inhibit axial movement of the control drum 100.

The control drum 100 includes a spur gear 108 formed as a part thereon. The spur gear 108 meshes with spur gear 94. This communicates the rotation of the spindle 56 to the control drum 100. The transfer of rotary movement initiated by the spring 90 through the spindle 50 via the paper strip 64 to the spindle 56 and through the gear train described above to the control drum 100 is seen in FIG. 7. In FIG. 7, the paper strip 64 has been wound onto the spindle 56 by rotation of the rewind knob 22 and it is in the process of winding back on to spindle 50. The components seen in FIG. 7 are as they would be during rewinding of the paper strip 64 back to the spindle 50.

The control drum 100 carries a first set of ratchet teeth 110 on its end opposite the spur gear 108. The ratchet teeth 110 are conventional ratchet teeth in that they are evenly spaced around the control drum 100 and are of a constant shape and width. A second set of ratchet teeth 112 are located between the ratchet teeth 110 and a flange 114 which is placed adjacent to the spur gear 108. The ratchet teeth 112 are elongated across a considerable portion of the cylindrical surface of the control drum 11.

Located between the ratchet teeth 112 are spacers of two types. The first of these types, collectively identified by the numeral 116, are spacers which are associated with the red answer button 26. The second of the types of spacers, spacers 118, are spacers which are associated with the blue answer button 30. The absence of either spacers 116 or 118 is associated with the yellow answer button 28. The spacers 116 extend axially between two of the ratchet teeth 112 from the flange 114 toward the ratchet teeth 110, a short distance. The spacers 118 extend the same way, except for a further distance. A pawl 120, identified in greater detail below, rides against the control drum 100 and can interact with either the ratchet teeth 110 or the ratchet teeth 112. The position of the pawl 120 as it interacts between the ratchet teeth 112 is dependent upon the presence of either spacers 116 or 118, or their absence. When a spacer 116 or 118 is absent between any two adjacent ratchet teeth 112, the pawl is free to move all the way to the left and abutt against the flange 114. When spacers 116 are present, the pawl 120 is restricted from moving all the way to the left against flange 114, but abutts against the spacer 116. When spacers 118 is present, the pawl is further restricted from moving to the left and abutts against spacers 118. Thus, if spacers 118 are present, the pawl can move axially only a short distance away from the ratchet teeth 110 toward the flange 114. If spacers 116 are present, pawl 120 can move further to the left away from ratchet teeth 110 toward the flange 114 and if neither spacers 116 or 118 are present, the pawl is free to move all the way to the left away from the ratchet teeth 110 toward and abutting against the flange 114.

The spacers 116 and 118 are present in a predetermined sequence which is best depicted by FIG. 15 wherein the surface of the control drum 100 has been cut and stretched longitudinally such that this surface is depicted linearly in a flat manner instead of as a surface of revolution. In FIG. 15 it can be seen that there are two spacers, 118, a and b, three spacers 116, a, b, and c, and three positions wherein both spacers 116 and 118 are absent. In total, then, there are eight positions around the surface of revolution of the control drum 100. These are referred to as control positions and are determined by the presence of spacers 116 and 118 or their absence.

The spacers 118 are associated with the blue answer button 30, while spacers 116 are associated with the red answer button 26, and the lack of spacers 116 and 118 are associated with the yellow answer button 28.

It can be seen in FIG. 16, which is taken about the lines 16—16 of FIG. 5, that the ratchet teeth 112 each have a sloping surface 122 and a flat surface 124. As the paper strip 64 is rewound from spindle 56 to spindle 50, the control drum 100 is caused to move in a clockwise manner as seen in FIG. 16. During turning of the rewind knob 22 to reposition the paper strip 64 from the spindle 50 to the spindle 56, the control drum 100 is caused to rotate counterclockwise as seen in FIG. 16. During counterclockwise rotation of the control drum 100 the sloping surfaces 122 of each of the ratchet teeth 112 engage the pawl 120, pushing outwardly until it slips over the peak and becomes lodged next to the flat surfaces 124 of each of the ratchet teeth 112. The flatness of the flat surfaces 124 which engage with the pawl 120 prevents clockwise rotation of the control drum 100. The prevention of the clockwise rotation of the control drum 100 by engagement of the pawl 120 with the flat surfaces 124 of the ratchet teeth 112 prevents the spring 90 from rewinding the paper strip 64 totally onto the spindle 50 from the spindle 56 when the paper strip 64 is so located on the spindle 56.

The control drum 100 is only allowed to move clockwise as seen in FIG. 16 stepwise as follows. As hereinafter explained, each time the advance button 24 is depressed, the pawl 120 is caused to move from left to right as seen in FIGS. 3, 4, 5 and 6. As the pawl 120 moves from left to right, it disengages the ratchet teeth 112 and moves to engagement with ratchet teeth 110. There are the same number of ratchet teeth 110 as there are ratchet teeth 112, except that the spacing of the ratchet teeth 110 with respect to the ratchet teeth 112 places the peak or point of each of the ratchet teeth 110 in between the peak or point of two adjacent ratchet teeth 112. That is to say, the ratchet teeth 110 are rotated out of phase with respect to the ratchet teeth 112.

As the pawl 120 moves from left to right and disengages the ratchet teeth 112 it moves along the flat surface 124 of one of the particular ratchet teeth 112, and as it leaves this flat surface in leaving the ratchet teeth 112, it is positioned mid way between two of the ratchet teeth 110. This allows the control drum 100 to move a small increment clockwise until the next in line ratchet tooth 110 engages against the pawl 120. Now if the pawl 120 is allowed to move from right to left, also as hereinafter explained, it moves off of the ratchet tooth 110 in moving to the left and becomes located between two of the ratchet teeth 112. Because of the clockwise bias imparted to the control drum 100 by the spring 90 via the gear train described above, the positioning of the pawl 120 between two adjacent ratchet teeth 112 allows control drum 110 to rotate a small increment clockwise until the pawl is once again located against one of the flat surfaces 124 of the next in line ratchet tooth 112. In this manner, the control drum 110 is allowed to move stepwise clockwise under the bias of the spring 90.

In the illustrative embodiment shown herein, there are eight each of the ratchet teeth 110 and eight each of the ratchet teeth 112. Thus, for each complete left, right, left movement of the pawl 120, the control drum therefore moves through 30° of rotation. This, of course would be different for a greater or lesser number of ratchet teeth 110 and 112.

The indicia located on the paper strip 64 is grouped into units, such as units 2, 52 and 53, evident in FIG. 14. The indicia located on one side of the paper strip 64 such as the top side 66, could include counting questions and the like, whereas the indicia located on the bottom side, such as the bottom surface 68 could include identification questions, such as "What Is It?" Thus for the individual units of indicia exposed in FIG. 14, the unit 2 asks the question with regard to a bell. The squares to the right side of the bell, with the words bee, owl and bell located thereon would be color coordinated with respect to the answer buttons 26, 28 and 30. The indicia 52 is asking a counting question, as to how many pumpkins are there, whereas the indicia 53 is asking an additional counting question. The individual units of indicia are spaced away from each other either on the bottom or top surfaces 68 and 66, respectively, of the paper strip 64 such that the rotation of the control drum 100 between two of the ratchet teeth 112 (30° for the illustrative embodiment) corresponds to movement of the paper strip 64 such that the units of indicia move from one unit of indicia to the next unit of indicia, as from unit of indicia 52 to unit of indicia 53 as illustrated in FIG. 14.

As is evident from FIG. 14, a large number of individual units of indicia can be located on the paper strip 64. As illustrated, units 52 and 53 are seen in FIG. 14. Since there are only eight control positions on the control drum 100 governed by the ratchet teeth 112, it is evident that each of the control positions exemplified by one of the ratchet teeth 112 will be coordinated with more than one unit of indicia on the paper strip 64. The answers to the questions on the particular units of indicia on the paper strip 64 will be present in a repeating sequence which corresponds to the sequence governed by the position of the pawl 120 against the control drum 100 with respect to the presence of a spacer 116 or 118 or the absence of either of these two. With the control drum 100 illustrated, as is seen in FIG. 15, the eight particular ratchet teeth 112 allow for the presence of a sequence comprising eight steps or positions of the pawl 120 with respect to the control drum 100. This same sequence is repeated with regard to the correct answers to the units of indicia located on the paper strip 64 a plurality of times.

Because of the presence of spur gear 94 connecting the control drum 100 to the spindle 56, the rotation sync of the control drum 100 is always the same with respect to the spindle 56. Thus, it is possible to correlate the units of indicia located on the paper strip 64 to the individual positions on control drum 100 determined by the spacers 116, 118 and their absence. Because of this, in assembling the toy 20, the toy 20 is assembled such that the correct answer to unit of indicia number 1 on the paper strip 64 for either the sequence of indicia located on the top surface 66 or the bottom surface 68 corresponds to the particular control position which is determined by the interaction of the pawl 120 with the ratchet teeth 112. As the units of indicia move through the viewing windows 34 and 36, the control drum 100 moves simultaneously such that the answer to any question expressed in the particular unit of indicia which might be exposed either through the bottom or the top window 34 or 36 always is correlated with the particular control position governed by the interaction of the pawl 120 with the spacers 116, 118 or their absence. When eight of these units of indicia have been moved past one or the other of the windows 34 or 36, the control drum 100 will have made one full revolution and upon positioning of the ninth unit of indicia beneath on of the windows 34 or 36, the control drum 100 would now be in position to once again repeat the sequence of control positions as is governed by the spacers 116, 118 and their absence.

The answers to the questions asked on either the top surface 66 or the bottom surface 68 of the paper strip 64 are also coordinated such that it matters not which position the select lever 38 is in, since the two units of indicia which are viewable, one through the top window 36 and one through the bottom window 34, would both have the same answer, for instance, an answer corresponding to the yellow answer button 28. By coordinating the two sets of indicia on the top and bottom surfaces 66 and 68 of the paper strip 64 with each other, and coordinating this in turn with the particular control positions governed by the spacers 116, 118 and their absence, on the control drum 100, a large multiplicity of units of information can be incorporated into the toy 20, utilizing a simple control drum 100 having, in the illustrative embodiment, only eight particular control positions. To a child utilizing the toy 20, the answers to the units of indicia will appear in a seemingly random manner, when in fact they are not, but are in a predetermined sequence.

Pawl 120 is hingedly attached to control a slide 126 or second control member. The control slide 126 includes two ears, collectively identified by the numeral 128, which accept an axle, not separately identified or numbered, formed as a part of the pawl 120. A hairpin spring 130 fits about this axle and biases the pawl 120 toward the control drum 100. The hairpin spring 130 allows movement of the pawl 120 away from the control drum 100 when it is rotated counterclockwise as seen in FIG. 16, during rewinding of the paper strip 64 on to the spindle 56.

The control slide 126 carries a finger 132 which projects upwardly from the flat planar surface of the control slide. It further includes tall ears 134 and 136, also projecting upwardly.

A negative output member 138 and a positive output member 140 are hinged via axles 142 and 144, respectively, to tall ears 134 and 136. Each of the output members 138 and 140 are capable of independently pivoting about the axles 142 and 144. The bottom housing 44 includes a small tab 146 located thereon to the left of the control slide 126. The control slide 126 includes a tab 148 located thereon. A spring 150 extends between the tabs 146 and 148 and biases the control slide 126 toward the left.

The control slide 126 is free to slide back and forth to the right and left. It is biased to the left by the spring 150 as noted above. The finger 132 is utilized as hereinafter explained, to move the control slide 126 to the right. Because the control slide 126 carries the pawl 120 and the negative and positive output members 138 and 140 pivotally on it, these also slide to the left and right in conjunction with the sliding movement of the control slide 126. As was noted previously, this allows positioning of the pawl 120 in different points along the control drum 100 such that it can interact with the spacers 116, 118 or the flange 114.

A boss 152 extends upwardly from the bottom housing 44 in the lower right hand corner of the toy 20. A disk 154, carrying a gear sector 156 thereon is positioned about the boss 152 such that it can rotate thereon. The disk 154 includes a slot 158 which is arcuate in shape. A complex shaped rotary member 160 is also rotatably mounted about the boss 152 and sits on the top of the disk 154. The member 160 includes a small, short axle 162, projecting from its bottom surface. The axle 162 is located on the bottom of the rotary member 160 such that it fits in to the slot 158. The disk 154 carries a tab 164 located thereon and a corresponding tab 166 is located on the bottom housing 44. A spring 168 extends between the tabs 164 and 166 and biases the disk 154 counterclockwise as seen In FIG. 4.

The boss 152 is hollow and includes a slot 170 along its cylindrical surface. A compression spring 172 fits within the hollow boss 152. The advance button 24 has a central boss 174 as seen in FIG. 12 with a key 176 located thereon. The boss 174 fits within the hollow interior of the boss 152, with the key 176 sliding in the slot 170. The spring 172 biases the advance button 24 upwardly. The advance button 24 also includes two wedge shaped projections, collectively identified by the numeral 178, projecting downwardly from its lower surface.

A curving wedge 180 is formed on one side of the rotary member 160 with a corresponding curving wedge 182 located on the other side. Projecting out of the uppermost surface of the curving wedge 182 is an engagement finger 184.

When the advance button 24 is depressed, its wedge projections 178 engage the curving wedges 180 and 182. Further depression of the advance button 24 causes the wedge projections 178 to slide along the curving wedge surface of the curving wedges 180 and 182 imparting a clockwise torque to these, which in turn, causes clockwise rotation of the rotary member 160.

The engagement finger 184 is positioned to interact with finger 132 on the control slide 126.

The axle 162 projecting downwardly from the bottom of rotary member 160 communicates the clockwise rotation of the rotary member 160, upon depression of the advance button 24, to the disk 154. The axle 162 is free to move through a few degrees of freedom by sliding within the slot 170. However, when it gets to the end of this slot 170, further rotation of the rotary member 160 is transferred to the disk 154. Rotation of the disk 154 in turn tenses the spring 168 by stretching it.

On depression of the advance button 24, the following events then happen. Upon initial depression of the advance button 24 the engagement finger 184 contacts the finger 132 on the control slide 126 and further rotation of the rotary member 160 is transferred to the control slide 126, sliding it from left to right. Also at this time, the axle 162 engages the end of slot 158, causing clockwise rotation of the disk 154, tensing the spring 168. When the wedge projections 178 have slid all the way down the curving wedges 180 and 182, further downward movement of the advance button 24 is inhibited. At this time, the rotary member 160 has moved clockwise sufficiently such that the control slide 126 has slid from left to right, to slide the pawl 120 free of the ratchet teeth 112 and position it within the ratchet teeth 110. This allows for a rotation of the control drum 100 of about 15° (one half of its 30° rotation based on the eight teeth in each of the ratchet teeth 110 and 112). Upon release of the advance button 24, the bias created in spring 168 causes counterclockwise rotation of the disk 154. As the disk 154 rotates counterclockwise, the slot 158 slides along the axle 162 until it becomes located in the opposite end of the slot, at which time the rotary member 160 rotates counterclockwise. This allows the control slide 126 to move back to the left under the bias of the spring 150. Upon sliding of the control slide 126 from right to left the pawl 120 disengages the ratchet teeth 110 and becomes engaged between two of the ratchet teeth 112, allowing for another 15° clockwise rotation (as viewed in FIG. 16) of the control drum 100 to complete repositioning of the pawl 120 from the space between two of the ratchet teeth 112 to the next adjacent space. Concurrently this allows rewinding of the paper strip 64 from the spindle 56 to the spindle 50 a sufficient amount to reposition a unit of information on both the top and bottom surfaces 66 and 68 of the paper strip 64 within the respective viewing windows 36 and 34. Of course, because of the presence of the slide member 70, only one of these units can be seen at any one time.

With each depression of the advance button 24, the sequence of events noted above occur to advance the paper strip 64 on to the spindle 50.

Upon its return slide from right to left, the ultimate resting position of the control slide 126 is dependent upon interaction of the pawl 120 with one of the spacers 116, 118 or, if the two ratchet teeth 112 between which the pawl 120 is located, does not have one of the spacers 116 or 118 located therein, position of the pawl 120 against the flange 114. Thus, movement to the right of the control slide 126 moves the pawl 120 out of engagement with the ratchet teeth 112 and into engagement with the ratchet teeth 110; movement to the left reverses this process and the ultimate resting position of the pawl 120 on the control drum 100 determines the ultimate resting position of the control slide 126 and the negative and positive output members 138 and 140 attached thereto.

The negative output member 138 has a left side notch 186, a central notch 188 and a right hand notch 190 in its surface. The positive output member 140 likewise has a left side notch 192, a central notch 194 and a right hand notch 196 formed in its surface. Since both the negative output member 138 and the positive output member 140 are positionable in several positions depending on the interaction of the pawl 120 with spacers 116, 118 or flange 114, these notches also all have several positions.

Looking now at FIG. 11. it can be seen that the red answer button 26 includes a central boss 198 projecting from its under surface as well as a negative engagement boss 200 and a positive engagement boss 202. Likewise, the yellow answer button 28 has a central boss 204, a negative engagement boss 206 and a positive engagement boss 208. In turn, the blue answer button 30 has a central boss 210, a negative engagement boss 212 and a positive engagement boss 214 projecting from its underneath surface.

Three upstanding hollow bosses, 216, 218 and 220 project upwardly from the bottom housing 44. The control slide 126 is shaped to include an elongated opening 222 which allows it to fit around the boss 218. It is further open at both of its ends, allowing it to fit around the bosses 216 and 220. This allows the control slide 126 to slide freely back and forth to the right and left about the bosses 216, 218 and 220.

The central boss 198 of the answer button 26 fits within the interior of boss 216. A small compression spring 224 is located within the interior of boss 216 and abuts against the end of the boss 198 on the button 26. This biases the button 26 upwardly. Likewise, bosses 204 on button 28 and 210 on button 30 fit within bosses 218 and 220 respectively, which also include identical springs also noted by the numeral 224. This positions the answer buttons 26, 28 and 30 and allows for movement along the vertical axis with them being biased upwardly by the springs 224.

Turning now to FIGS. 8, 9 and 10, interaction of the answer button 28 with the negative and positive output members 138 and 140 is illustrated. When the pawl 120 is all the way toward the left hand side of the control drum 100, positioned against the flange 114, this corresponds to a correct answer for indicia identified with the color yellow. During use of the toy 20, if the pawl 120 was so positioned, and if yellow was the correct color associated with the correct indicia, the control slide 126 would be positioned such that, in side view, the negative and positive output members would be as seen in side view in FIG. 8. In this position, the central notch, 188, in the negative output member 138 is so positioned such that if the yellow answer button 28 were depressed, the negative engagement boss 206 on the bottom of the answer button 28 would be positioned to pass through the central notch 188 as can be seen in moving from FIG. 8 to FIG. 9. However, the positive engagement boss 208 would be positioned to abutt up against the surface of the positive output member 140. Thus, upon depression of the button 28, the positive output member 140 would be rotated about axles 142 and 144, displacing it downwardly, whereas the negative output member 138 would not be effected and would remain stationary.

If the correct answer was an answer associated with either red or blue and thus the pawl 120 had abutted against spacers 116 or 118 and not against flange 114, yellow would be considered a wrong answer. In this instance, the control slide 126 would be in a different position with respect to positioning of the notches located on the negative and positive output members 138 and 140 with respect to the negative and positive engagement bosses 206 and 208 on the button 28. Depending upon whether or not the correct answer was associated with either blue indicia or red indicia, the notch 188 on the negative output member 138 would be displaced to the right or to the left of the negative engagement boss 206 on the button 28. However, the central notch 194 on the positive output member 140 would be positioned directly below the positive engagement boss 208. Upon depression of the button 28 in this situation, which is as depicted in FIG. 10, the negative engagement boss 206 would engage the negative output member 138 rotating it about the axles 142 and 144. However, the positive engagement boss 208 would pass through the notch 194 and not interact with the positive output member 140.

If the pawl 120 is therefore engaged against the spacers 116 or 118, the control slide 126 is positioned such that depression of the answer button 28 will always result in engagement of it with the negative output member 138.

The other answer buttons 26 and 30 work in a like manner. When the pawl 120 is abutted against the side of the spacer 118, the control slide 126 is positioned such that the positive engagement boss 214 on the bottom of the blue answer button 30 will contact the positive output member 140 while the negative engagement boss 212 will not contact the negative output member 138, because of shifting of the negative output member 138 to the right such that the boss 212 completely misses this member. For the red and yellow answer buttons, however, buttons 26 and 28, their positive engagement bosses 202 and 208 respectively, will pass through the notches 196 and 194 on the positive output member 140 and as such they will not engage the positive output member. However, their negative engagement bosses 200 and 206, respectively, will engage the negative output member 138, rotating the same.

For location of the pawl 120 against the spacer 116, the control slide 126 will be positioned such that the positive engagement boss 202 on the button 26 will contact the positive output member 140, whereas the negative engagement boss 200 will pass through notch 190 on the negative output member. If the buttons 28 or 30 were erroneously pushed when red was the correct answer, the positive engagement bosses 208 and 214 located thereon respectively would pass through notches 194 and 192 respectively on the positive output member and thus would not depress the same, whereas their negative engagement bosses 206 and 212 would contact the negative output member 138, rotating the same.

A boss 226 projects upwardly from the bottom housing 44 and carries the indicator dial 32 thereon. The indicator dial 32 carries a set of ratchet teeth 228 on its outside surface. An escapement lever 230 is located adjacent to the indicator dial 32 by pivotally mounting it upon a boss 232. The escapement lever 230 is biased counterclockwise about the boss 232 by a spring 234 which has one of its ends attached to the escapement lever 230 and the other of its ends attached to a further upstanding boss 236 projecting upwardly from the bottom housing 44. The escapement lever 230, as can be seen in FIGS. 8, 9 and 10, carries a wedge shaped projection 238 thereon which is positioned to fit underneath the negative output member 138.

Whenever the negative output member 138 is depressed downwardly by interaction by one of the negative engagement bosses located on the answer buttons 26, 28 or 30, the downward movement of the negative output member 138 as it rotates about its axles 142 and 144 brings it in contact against the wedge shaped area 238 formed on the escapement lever 230. Since the escapement lever 230 cannot be pushed downwardly, because it is fixedly mounted about the boss 232, the downward force imparted to the wedge 238 by the negative output member 138 is transferred into a rotary force causing rotation of the escapement member 230 about the boss 232, stretching spring 234. This rotation is in a clockwise direction as viewed in FIG. 4.

The escapement lever 230 includes two pawls 240 and 242. Upon clockwise rotation of the escapement lever 230 pawl 240 is pulled free of the ratchet teeth 228 and pawl 242 is pushed into these ratchet teeth. This imparts a counterclockwise force against the indicator dial 32, causing it to rotate a small increment counterclockwise. When the negative output member 138 is allowed to rotate upwardly after release of whatever answer button 26, 28 or 30 ultimately caused it to be depressed, its upward movement disengages it from the wedge 238 and allows the escapement lever 230 to rotate counterclockwise under the bias imparted into spring 234. This frees the pawl 242 from the ratchet teeth 228 and once again engages the pawl 238 in these ratchet teeth. This in turn imparts a further, small, counterclockwise rotation to the indicator dial 32. The net effect of this is that every time the negative output member 138 is depressed downwardly, the indicator dial 32 is caused to rotate one increment counterclockwise, indicating that a wrong answer has been chosen and a wrong button, whether it be button 26, 28 or 30, was depressed.

Figure 13:
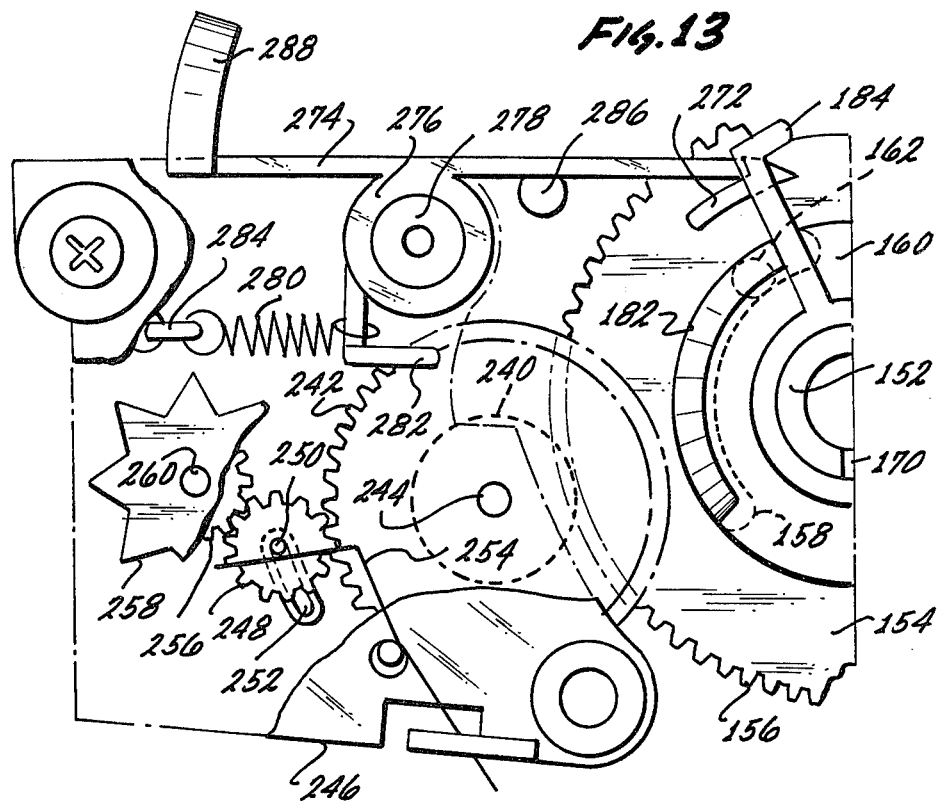
FIG. 13 is an enlarged view of a portion of FIG. 2.

As an indication to the user of the toy 20 that the proper or correct button 26, 28 or 30 was depressed, a bell is rung, as noted earlier. The mechanism which causes the ringing of the bell can be seen in part in FIG. 13, and in part in certain of the other of the Figures, 2 through 5, which all show this same mechanism.

Rotation of the rotary member 160, as noted above, was communicated to the disk 154. It was noted that the disk 154 carried a gear sector 156 thereon. A gear having pinion teeth 240 meshes with the gear sector 156 and is thus rotated with respect to rotation of the disk 154. This gear also carries a spur gear 242 which rotates in conjunction with the pinion 240. The gear is appropriately suspended by an axle 244 which fits into an appropriate bearing surface, not identified or numbered, in the bottom housing 44, as well as in an opening, not identified or numbered, located in a plate 246.

A swing gear 248 mounted upon an axle 250 is positioned between the bottom housing 44 and the plate 246 by appropriately locating the axle 250 within a slot 252 formed on the bottom housing 44 and an identical slot, not seen or numbered, formed on the underneath side of the plate 246. This allows the swing gear 248 to ride up and down within the slot 252. A hairpin spring 254 biases the swing gear 248 upwardly in this slot. The swing gear 248 is always in engagement with the spur gear 242.

A second compound gear having a pinion 256 and a star gear 258 located on it, is appropriately suspended by an axle 260 in bearing surfaces not identified or numbered, formed in the bottom housing 44 and the plate 246. During clockwise rotation of the disk 154 upon depression of the advance button 24, the clockwise rotation of the disk 154 is transferred into counterclockwise rotation of the spur gear 242. This pushes the swing gear 248 downwardly against the bias of the spring 254 such that the swing gear 248 disengages with pinion 156 and thus does not transfer rotation to it. Upon counterclockwise rotation of the disk 154 under the bias of spring 168, the spur gear 244 is caused to rotate clockwise, which forces the swing gear 248 upwardly in its slot 252, meshing it with the pinion 256 and thus transferring the rotation to the pinion 256 which in turn rotates the star gear 260.

An escapement lever 262 is held on the top of plate 246 by an arm 264 held to the plate 246 by an appropriate screw. The escapement lever 262 carries a spring 266 thereon which includes a weight 268 on its end. The weight 268 contacts bell 270. On counterclockwise rotation of the disk 154 the escapement arm 262 is oscillated by the star gear 258 and this oscillation causes the weight 268 to strike the bell 270, emitting a ringing sound.

The disk 154 also carries a ratchet dog 272. An arm 274 is fixed to a boss 276. The boss 276 in turn is mounted about a boss 278, which projects upwardly from the bottom housing 44. The arm 274 and its boss 276 are biased clockwise by a spring 280 attaching to a tab 282 on the boss 276 and a like tab 284 on the bottom housing 44.

A small projection 286 formed on the bottom housing 44 limits the extent of the clockwise movement of the arm 274. One end of the arm 274 is positioned such that it can engage the ratchet dog 272. As the disk 154 is rotated clockwise under the influence of the advance button 24, the dog 272 engages the end of the arm 274, rotating the arm 274 counterclockwise until the dog has passed the end, and when the advance button 24 is released, counterclockwise rotation of the disk 154 is prevented by locking of the end of the arm 274 in the dog 272 against the bias of the spring 168.

When the positive output member 140 is rotated about the axles 142 and 144, it, in moving downwardly, strikes a wedge projection 288 formed on the other end of the arm 274. Depression of the positive output member 140 pushes against this wedge projection and since the projection cannot move downwardly, it causes rotation of the arm 274 counterclockwise about the boss 278 against the bias of the spring 280. This frees the other end of the arm 274 from the dog 272, allowing rotation of the disk 154 in a counterclockwise manner under the bias of the spring 168. Rotation of the disk 154 is thus transferred to the escapement lever 262, causing ringing of the bell 270. Thus, if the user of the toy 20 depresses one of the answer buttons 26, 28 or 30, and it is the correct answer button such that interaction occurs with the positive output member 140, this is ultimately communicated back to the user of the toy by the ringing noise emitted by the bell 270.

In FIG. 4, the situation is depicted wherein the pawl 120 has moved from engagement with any of the ratchet teeth 112 and has engaged the ratchet teeth 110. At this time, as noted above, the control drum 100 is allowed to rotate a slight amount (15° for the embodiment shown herein where there are eight each ratchet teeth 110 and ratchet teeth 112). Also at this time it can be seen that as the control slide 126 was moved to the right by the rotation of the rotary member 160, the dog 272 on the disk 154 has cleared the end of the arm 274. All of this, of course, happens upon depression of the advance button 24.

Moving now to FIG. 5, it can be seen that advance button 24 has been released and the end of the lever 274 has become locked against the dog 272, preventing counterclockwise rotation of the disk 154. Additionally, the control slide 126 has moved to the right under the bias of spring 150 and, in FIG. 5, the control drum 100 is positioned such that the pawl 120 becomes engaged against one of the spacers 118 (corresponding to the blue answer button 30 being the correct answer button). This positions the control slide 126 such that if the answer button 30 were located in FIG. 5, it is evident that it would, upon depression, engage only the positive output member 140 and not the negative output member 138, because of the displacement of the negative output member 138 well to the right of the boss 220 on which the button 30 is located.

In the situation depicted in FIG. 5, the line 10—10 going across the yellow answer button 26 shows that if the yellow answer button 28 were depressed for the situation depicted in this FIG., the negative output member 138 would be depressed and not the positive output member 140 because of the location of the center notch 194 on the positive output member 140, almost in line with the boss 218 on which the yellow answer button is located.

Moving now to FIG. 3, the situation is illustrated wherein the pawl 120, in moving to the left, has become engaged against the one of the spacers 116, positioning the control slide 126 such that now the red answer button 26, if depressed, would bear down on the positive output member 140. Note that the positive output member 140 is slightly displaced to the left of the boss 216 on which the red answer button 26 rests. However, the positive and negative engagement bosses 202 and 200, respectively, on the button 26, as is evident from FIG. 11, are displaced slightly to the left of the center of the button. Because of this, it can be seen that the notch 190 would serve to allow for the button 26 not engaging the negative output member 138, yet the presence of a portion of the positive output member 140 directly across from this notch would serve to allow for engagement of the button 26 with the positive engagement member 140.

Now moving to FIG. 6, it can be seen that in this Figure, the pawl 120 is abutted against the flange 114, and as such, the control slide 126 is positioned such that it is the center answer button, the yellow answer button 28, which would engage the positive output member 140, whereas the other two buttons 26 and 30, if depressed, would engage the negative output member 138. Note in FIG. 11 for button 30, that the negative engagement boss as well as the positive engagement boss, bosses 212 and 214, respectively, are displaced slightly to the right, thus the positive engagement boss 214 would slide through the notch 192, while the negative one would engage the member 138, The answer buttons 26, 28 and 30 serve as test members, i.e. test means, to test the correctness of the guess of the user of the toy 20 with respect to the unit of information currently displayed, to which the user is responding. For the toy 20 illustrated, three of these testing devices, i.e., answer buttons, have been shown. It is, of course, evident that a lesser amount or a greater amount could be utilized by simply decreasing or increasing the number of notches on both the negative and positive output members 138 and 140, respectively.

I claim:

1. A toy information indicating device which comprises:

a housing;

an indicia carrier means located on said housing, said indicia carrier means including a plurality of indicia units located thereon, said indicia carrier means movable on said housing allowing each of said indicia units to be viewable at least one at a time from the exterior of said housing;

control means located on said housing in operative association with said indicia carrier means, at least a portion of said control means movably mounted on said housing so as to move between a plurality of control positions, each of said indicia units of said indicia carrier means coordinated with one of said control positions, said portion of said control means movable between said plurality of said control positions in response to movement of said indicia carrier means;

test means located on said housing in operative mechanical association with said control means, said test means including at least a first test member and a second test member each of which is movable on said housing with respect to said control means to mechanically interact with said control means so as for each of said positions of said movable portion of said control means one of said test members in moving with respect to said control means interacts with said control means in a first manner and the remainder of said test members in moving with respect to said control means interacts with said control means in a second manner;

indicator means operatively associated with said control means and capable of indicating in which of said first or said second manners each of said test members interacted with said control means.

2. The device of claim 1 including:

advancing means operatively associated with both said movable portion of said control means and said indicia carrier means, said advancing means for advancing said movable portion of said control means from one of its control positions to a next of its control positions and simultaneously moving said indicia carrier means so as to change the indicia unit which is viewable from the exterior of said housing.

3. The device of claim 2 wherein:
said control means includes at least a first control member and a second control member, said control position governed by said first control member, said test means interacting with said second control member.

4. The device of claim 3 wherein:
said second control member is operatively associated with and interacts with said indicator member in response to interaction of said test means with said second control member.

5. The device of claim 4 wherein:
said indicator means includes a first output means and a second output means, said first output means capable of indicating interaction of said test members with said second control member in said first manner and said second output means capable of indicating interaction of said test members with said second control member in said second manner.

6. The device of claim 5 wherein:
said first control member is rotatably mounted on said housing and includes a plurality of positioning elements corresponding to said control positions located thereon;
said second control member is slidably mounted on said housing and includes an element interacting means positioned in association with said first control member and capable of interacting with said positioning elements.

7. The device of claim 6 wherein:
said second control member further includes a control slide member, a positive output member and a negative output member, said control slide member slidably mounted on said housing, said element interacting means and said positive output member and said negative output member independently pivotally mounted on and carried by said control slide member;
said positive output member operatively associated with said first output means and said negative output member operatively associated with said second output means;
said test members independently capable of interacting with one of said positive output member or said negative output member in each of said control positions governed by said first control member.

8. The device of claim 7 wherein:
each of said test members is movable on said housing from a non-engagable position with respect to said second control member to an engagable position with respect to said second control member;
said positive output member and said negative output member each including a plurality of discontinuities in said member, each of said test members in their engagable positions capable of engaging one of said positive output member or said negative output member but becoming located within one of said discontinuities in the other of said positive output member or said negative output member such that movement of said test member from its non-engaged to its engaged position engages said test member with one of said positive output member or said negative output member but not the other of said positive output member or said negative output member.

9. The devices of claim 8 wherein:
said information support means comprises first and second spindles each rotatably mounted on said housing and said indicia carrying means comprises an elongated strip capable of being wound about each of said spindles and having said indicia units thereon.

10. The device of claim 9 including:
gear train means operatively associating said first spindle and said first control member to rotate said first control member in response to rotation of said first spindle, said rotation of said first spindle transferred to said second roller means by said elongated strip.

11. The device of claim 10 wherein:
said second spindle further includes biasing means operatively associated with it, rotation of said second spindle in a first direction energizing said biasing means and when so energized said biasing means capable of rotating said second spindle in the opposite direction of rotation.

12. The device of claim 11 wherein:
said positioning elements on said first control member comprise positioning spacers equal in number to the number of said test members, said positioning spacers divided into groups, the number of said groups equal in number to the number of said test members, said groups of said spacers positioned axially with respect to one another on said first control member;
said element interacting means comprising a pivotable pawl mounted on said second control member and capable of interacting with each of said groups of said positioning spacers with respect to a different axial displacement of said pawl with respect to said first control member in response to sliding of said second control member on said housing.

* * * * *

UNITED STATES PATENT AND TRADEMARK OFFICE
CERTIFICATE OF CORRECTION

PATENT NO. : 4,482,329

DATED : NOVEMBER 13, 1984

INVENTOR(S) : YASUSHI SHINDO

It is certified that error appears in the above-identified patent and that said Letters Patent is hereby corrected as shown below:

Column 1, line 36 "resepct" should be --respect--.
Column 1, line 36 "ot" should be --or--.
Column 2, line 17 "sad" should be --said--.
Column 2, line 65 "associaition" should read --association--.
Column 5, line 20 "a" should read --an--.
Column 5, line 21 "advace" should read --advance--.
Column 5, line 62 & 64 "bottom" should be --top--.
Column 5, line 64 "34" should read --36--.

Column 9, line 48 and 51 "110" should read --100--.
Column 9, line 57 "30°" should be --45°--.
Column 10, line 10, "30°" should be --45°--.
Column 10, line 61 "on" should be --one--.
Column 12, line 53 "30°" should be --45°--, and "15°" should be --22.5°--.
Column 12, line 65 "15°" should be --22.5°--.

Column 8, line 34, "abutt" should read --abuts--;
line 36, "abutts" should read --abuts--;
line 46, "abutting" should read --abuts--.

UNITED STATES PATENT AND TRADEMARK OFFICE
CERTIFICATE OF CORRECTION

PATENT NO. : 4,482,329

DATED : NOVEMBER 18, 1984

INVENTOR(S) : YASUSHI SHINDO

It is certified that error appears in the above-identified patent and that said Letters Patent is hereby corrected as shown below:

```
     Column 13 line 17 before "position" inject --the--.
     Column 13, line 36 "." should be --,--.
     Column 13, line 57 "abutts" should be --abuts--.
     Column 14, line 15 "abutts" should be --abuts--.
     Column 14,  line 20 "effected" should read --
affected--.
     Column 17, line 20 "15°" should be --22.5°--.
     Column 17, line 45 "26" should be --28--.
     Column 20, line 29 "roller means" should read --
spindle--.
```

Signed and Sealed this

Thirteenth Day of August 1985

[SEAL]

Attest:

DONALD J. QUIGG

Attesting Officer     Acting Commissioner of Patents and Trademarks